Jan. 17, 1967     E. FRISCH     3,299,302

LINEAR MOTION DEVICE

Filed Aug. 20, 1964     2 Sheets-Sheet 1

INVENTOR
Erling Frisch
BY
ATTORNEY

Jan. 17, 1967  E. FRISCH  3,299,302
LINEAR MOTION DEVICE
Filed Aug. 20, 1964  2 Sheets-Sheet 2

United States Patent Office 3,299,302
Patented Jan. 17, 1967

3,299,302
LINEAR MOTION DEVICE
Erling Frisch, Pittsburgh, Pa., assignor to Westinghouse Electric Corporation, Pittsburgh, Pa., a corporation of Pennsylvania
Filed Aug. 20, 1964, Ser. No. 390,903
9 Claims. (Cl. 310—12)

The present invention is directed to linear motion devices and more particularly to a linear motion device actuated by magnetic coils and having gripper arms thereon for rectilinearly moving an element in an incremental manner only in one direction.

In the past, linear motion devices of the general type to which this invention pertains have been developed for rectilinearly moving an element wherein gripper arms are moved into and out of engagement with an elongated toothed element for moving the element incrementally in opposite directions. Actuation of the gripper arms has been achieved by the use of solenoid coils and these coils constitute an expensive part of the linear motion device particularly where such devices are used in conjunction with high temperature systems. One example of a linear motion device is shown and described in my copending application, filed April 30, 1962, Serial No. 191,218, now Patent No. 3,158,766, entitled, "Linear Motion Device," and assigned to the present assignee. In the above application, there is illustrated a linear motion device which is capable of moving a linear element incrementally in opposite directions under conditions wherein wear between the teeth of the linearly movable element and the gripper arms is substantially eliminated.

My linear motion device of the aforesaid patent utilizes, in the illustrative embodiment thereof, three solenoid type coils for obtaining actuation of the linearly movable element. The use of three solenoid type coils contributes substantially to the cost of the latter device; however, in accordance with my understanding of the art, to obtain incremental linear motion in opposite directions, the use of merely three solenoid coils constitutes an absolute minimum.

In certain applications, however, it is unnecessary to provide incremental linear motion in opposite directions. Such applications necessitate only undirectional incremental linear motion, provided of course, a suitable means exists at the end of such unidirectional incremental motion to relocate the linearly movable element at an initial or starting position. The placement of the linearly movable element in its starting position, may be achieved in many ways, for example, by permitting the linearly movable element to move freely under the influence of gravity back to its starting position.

Accordingly it is an object of this invention to provide a linear motion device of novel construction for moving a linearly movable element incrementally in only one direction.

It is another object of this invention to provide a device of the type described in the preceding object wherein substantial wear on the moving parts of the device is effectively eliminated.

A further object of this invention is to provide a new and improved linear motion device having a plurality of solenoid actuated members wherein the number of solenoid actuating coils is minimized.

A further object of this invention is to provide a compact and rugged linear motion device of novel construction which utilizes gripping members which provide positive engagement between the element to be moved and the gripping members thereby removing the possibility of slippage therebetween.

Briefly, the present invention accomplishes the above-cited objects by providing a gripper type linear motion device utilizing merely two solenoid coils to provide unidirectional incremental linear motion for a linear movable element. One of the solenoid coils of this invention provides for the latching and unlatching function of one of two axially spaced grippers for the linearly movable element. The other solenoid coil provides not only for the latching and unlatching of the other of the two spaced grippers for the linearly movable element, but also provides for the function of incrementally moving the linear element in the desired direction. The incremental movement of the element is achieved with only two coils because lifting movement of the element by the latter gripper takes place while the former gripper is still latched to the element for at least a portion of the lifting motion. Excessive wear between the teeth of the linearly movable element and the axially spaced grippers is prevented by the employment of a phenomenon known as "load transfer" which will be more fully explained hereinafter. The load transfer function is such as to prevent frictional engagement between the lifting gripper and the teeth of the linearly movable element during lateral relative movement therebetween. The load transfer function with respect to the other gripper is achieved by preventing frictional engagement between the gripper and the teeth of the linearly movable element at least during lateral movement of the last mentioned gripper toward the linearly movable element.

It is to be noted that the sequential energization of merely two solenoid coils is of necessity less time consuming than the sequential energization of three or more solenoid coils of the devices of the prior art. Furthermore, in accordance with the invention, the energization cycle for the two solenoid coils may be overlapped somewhat. Both the minimized number of solenoid coils and the overlapping of the energization cycle for the coils results in a substantial increase in the speed of movement of the movable element.

Further objects and advantages of this invention will become apparent as the following description proceeds and features of novelty which characterize the invention will be pointed out in particularity in the claims annexed to and forming a part of this specification.

For a better understanding of the invention, reference may be had to the accompanying illustration in which.

Figure 1:
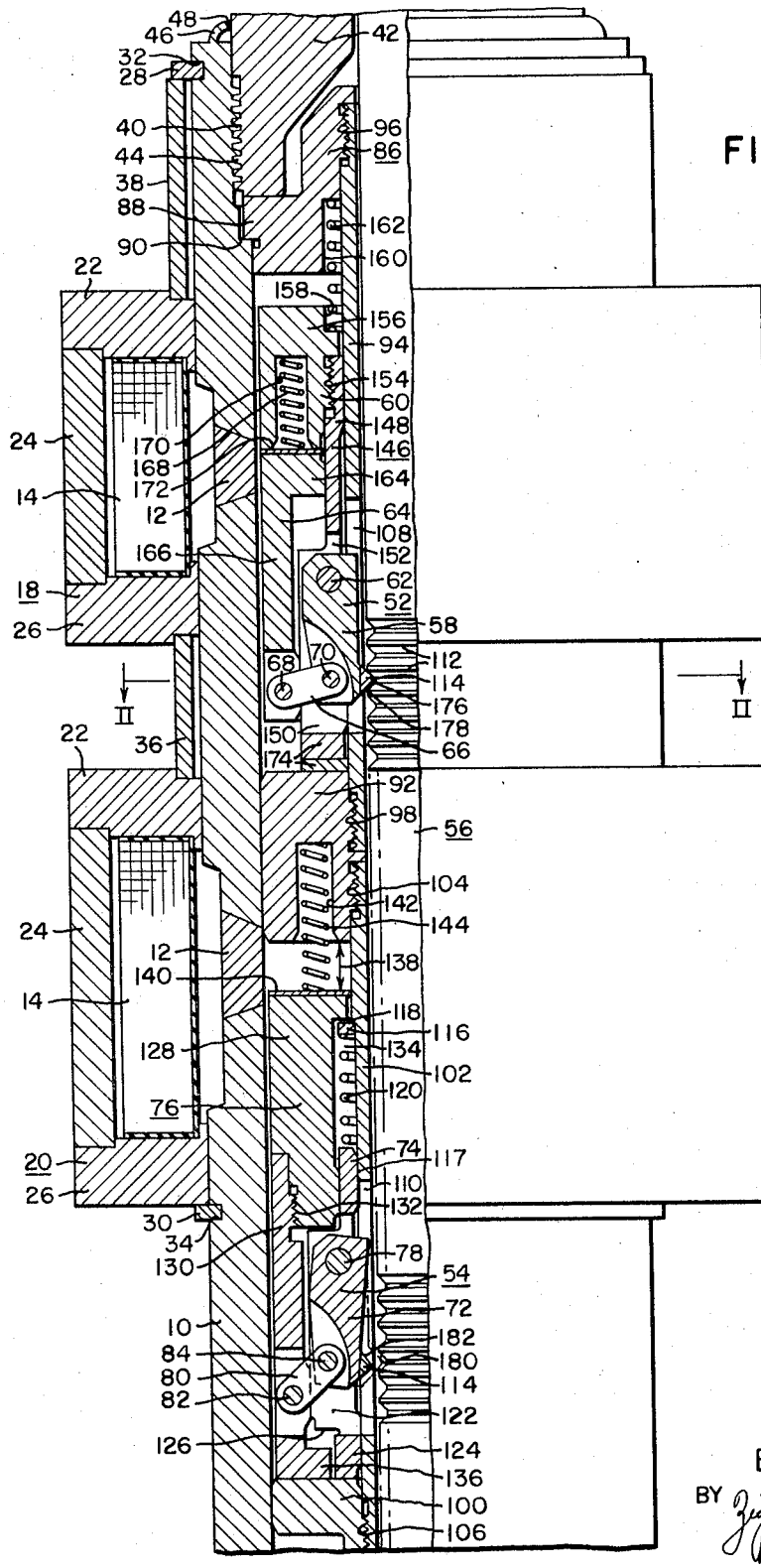
FIGURE 1 is a side elevation view, partially in section, of a linear motion device constructed in accordance with the principles of this invention.
Figure 2:
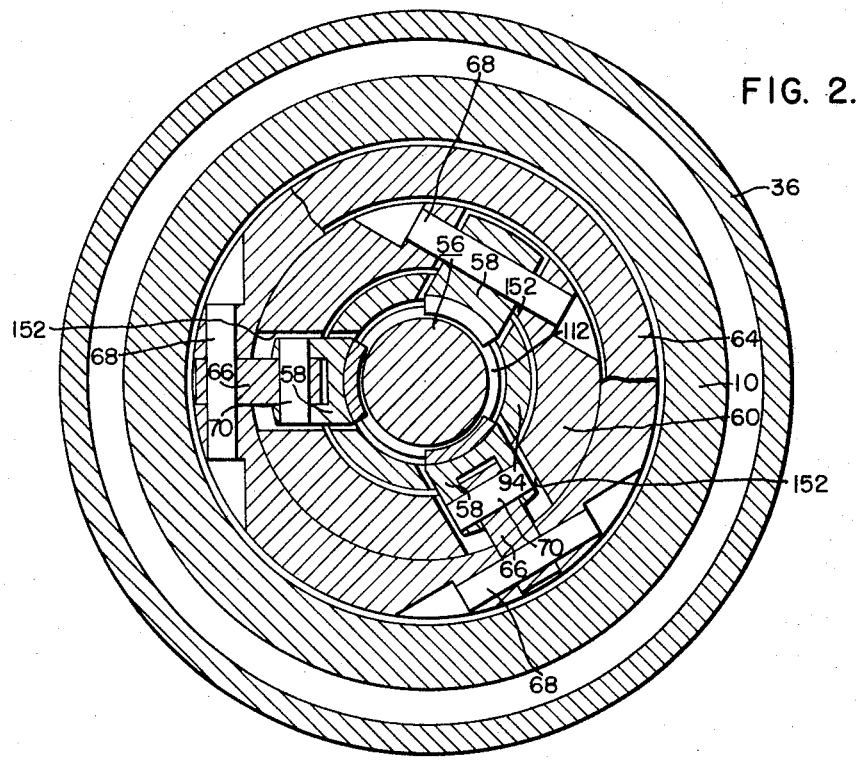
FIG. 2 is a sectional view of the apparatus illustrated in FIG. 1 and taken substantially along the lines II—II thereof.

For purposes of understanding the instant invention, it will be noted that the grippers of the linear motion device and the linear element which is moved thereby may be located in four relative positions. One of the aforesaid relative positions is defined herein as the "unlatched" position wherein the gripper is laterally spaced from the teeth of the linearly movable element so that axial relative movement of the gripper with respect to the teeth does not result in frictional engagement of the gripper therewith. For example, the lower gripper of FIG. 1 is located in the unlatched position.

Figure 4:
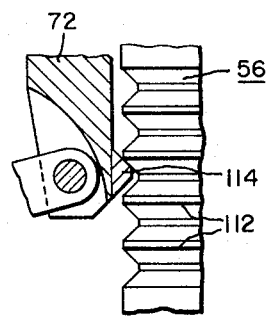
FIG. 4 is a fragmentary view similar to FIG. 3 of one of the lower grippers of FIG. 1 illustrated in the "latched" position.

A second relative position is defined herein as the "latched" position wherein the gripper element is engaged with the linearly movable element with the gripper being subjected to the load or weight of the linearly movable element. The latched position of the gripper is illustrated in FIG. 4 of the drawings. In addition, the upper gripper of FIG. 1 is illustrated in the latched position.

Figure 3:
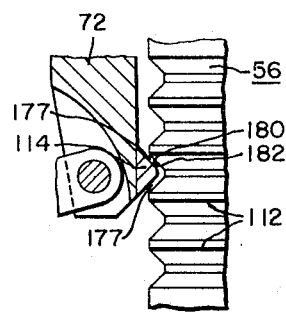
FIG. 3 is a fragmentary view of one of the lower grippers of FIG. 1 illustrated in the "coupled" position.

The third relative position of the components is defined as the "coupled" position wherein the gripper is located in its engaged position relative to the linearly movable element but the gripper is not subjected to the load created thereby. In other words, the gripper in the coupled position is in the same lateral position with respect to the teeth of the movable element as in the latched position, but the relative axial positions of the teeth and the gripper are such that a clearance exists between the teeth of the linearly movable element and the outward tip of the gripper, as illustrated in FIG. 3.

The fourth relative position is defined herein as the "linked" position. In the linked position, the gripper is located in its engaged position relative to the linearly movable element but the lower surface of the tip of the gripper frictionally engages an upwardly facing surface of one of the teeth of the linearly movable element. In this embodiment of the invention, only the upper gripper of FIG. 1 is, at times, disposed in the linked position, which position is illustrated specifically in FIG. 5. In the linked position, the gripper is not carrying the load of the movable element and the surfaces of the gripper which are frictionally engaged are not the same surfaces which are engaged when the gripper is in the latched position.

It will therefore be understood that the differences between the latched position, the coupled position, and the linked position of a gripper exists not with respect to the radial or lateral position of the gripper, inasmuch as the radial position of the gripper would be the same, but by virtue of the different relative axial positions of the linearly movable element and the gripper. In the latched position, the linearly movable element is in an axial position wherein the gripper is subjected to the load thereof. More specifically the upwardly facing surface of the tip of the gripper is in engagement with a downwardly facing surface (as viewed in FIGS. 1 and 4) of one of the teeth of the linearly movable element. For the coupled position, the linearly movable element and gripper are in relative axial positions wherein the gripper is spaced from the radially extending surfaces of adjacent teeth of the linear element and thereby is not subjected to the load thereof. In the linked position, a clearance exists between the upwardly facing surface of the tip of the gripper and the downwardly facing surface of the associated tooth of the linearly movable element. However, the downwardly facing surface of the tip of the gripper and the upwardly facing surface of the associated tooth of the linearly movable element are in engagement so that, should the gripper be moved from the linked position to the unlatched position, frictional interaction and wear on the last mentioned surfaces will occur. Such wear on the last mentioned surfaces is not deemed critical particularly since the latter surfaces do not cooperate in the axial positioning of the linearly movable element and since the weight of the linear element is not excited upon those surfaces during such relative motion thereof, as will be hereinafter more fully explained.

Referring now with particularity to the apparatus illustrated in FIGS. 1 thorugh 5, a linear motion device constructed in accordance with the principles of this invention is provided with a tubular outer housing 10. In this example, the housing 10 is formed from magnetic material of a thickness capable of withstanding internal pressures of magnitudes on the order of 2000 p.s.i. and formed for certain applications to seal hermetically the interior of the housing 10. The housing 10 may be provided with a pair of spaced circumferential weld inserts 12 disposed between adjacent axial portions of the housing 10 and formed from nonmagnetic material. The function of the weld inserts 12 is to interrupt a shunting magnetic path which would exist along the housing 10 in the axial direction, were the housing formed completely from magnetic material. A pair of annular solenoid coils 14 are mounted in an axially spaced array on the outer surface of housing 10 at positions juxtaposed to the nonmagnetic weld inserts 12. The two solenoid coils 14 form solenoids 18 and 20 of the linear motion device. The solenoid coils 14 are each provided with a tubular support structure including magnetic portions 22, 24 and 26 which form a path for the magnetic flux generated by each of the coils 14. The disks 22 and 26 are mounted respectively above and below each of the coils 14 and are formed from magnetic material. The cylinder 24 is disposed outwardly of the coil 14 in juxtaposed relationship therewith and bridging the outward edges of the adjacent disks 22 and 26. The solenoids 18 and 20 are sized to be slid over the outward surface of the housing 10 and to be fixedly disposed at positions juxtaposed to the nonmagnetic inserts 12 of the housing 10 by suitable means, such as by upper and lower snap rings 28 and 30 which are received respectively in annular slots 32 and 34 in housing 10. The disk 26 of the solenoid 20 is positioned in engagement with the lower snap ring 30 and the solenoids 18 and 20 are fixedly positioned by spacers 36 and 38 and snap ring 28.

The lower end of the housing 10 is desirably provided with a suitable extension (not shown) for the purpose of securing the housing 10 to a system with which the linear motion device is utilized. The upper end of the housing 10 is provided with circumferential threads 40 disposed on the inward surface thereof which are formed to receive a cap member 42, shown partially in FIG. 1. The cap member 42 is desirably of annular configuration and is provided with complementary threads 44 thereon which engage the threads 40 of the housing 10. The upper end of the cap 42 extends upwardly of the upper edge of the housing 10 resulting in a stepped configuration at the jointure thereof. The stepped configuration permits the use of a suitable sealing means such as an annular canopy seal member 46 to hermetically seal the interior of the housing 10. The canopy 46 desirably forms a part of housing 10 and is secured to the cap 42 by an annular weld 48.

The interior of the housing 10 is formed to receive upper and lower annular gripper assemblies with the upper gripper assembly designated generally by the reference character 52 and the lower gripper assembly designated generally by the reference character 54. The gripper assemblies 52 and 54 are mounted for movement within the housing 10 relative to a toothed linearly-movable element or lead screw 56. By energizing the solenoids 18 and 20 in a predetermined sequence, the upper gripper assembly 52 is movable independently of the lower gripper assembly 54 to the latched, coupled, linked and uncoupled positions relative to the lead screw 56 while the lower gripper assembly 54 is movable sequentially to the latched, coupled and uncoupled positions with respect to the lead screw 56.

Each of the annular gripper assemblies 52 and 54 includes a plurality of circumferentially spaced gripper arms which are pivotally connected to a pair of axially movable supports. More particularly, the upper gripper assembly 52 comprises three gripper arms 58 with each of the gripper arms 58 pivotally connected to an axially movable support 60 by a pivot pin 62 and to a second axially movable support 64 by a link member 66 and pivot pins 68 and 70. Similarly, the lower gripper assembly 54 may include three gripper arms 72 pivotally connected to axially movable independent support members 74 and 76. Each gripper arm 72 is connected to the support 74 by a pivot pin 78 and is connected to the support 76 through links 80 and pivot pins 82 and 84.

The gripper assemblies 54 and 56 are movable axially within the housing 10 between annular stops 86, 92 and 100. More specifically, the upper stop member 86 is fixedly positioned in the housing 10 by cap member 42. The upper stop 86 is provided with an outwardly extending flange 88 and is fixedly positioned on an upwardly facing shoulder 90 formed on the inner surface of the housing 10. The flange 88 is clamped against the shoulder 90 by the annulus or cap 42. The intermediate stop 92, of annular configuration is closely received by the inner surface of housing 10, and is positioned between the gripper assemblies 52 and 54 by a spacing sleeve 94. The spacing sleeve 94 is secured at its ends 96 and 98 to upper stop 86 and intermediate stop 92, respectively. The annular lower stop 100 is disposed to underlie the lower gripper assembly 54 and is fixedly positioned with respect to the housing 10 by means of a second spacing sleeve 102 threadly secured at its ends 104 and 106 to intermediate stop 92 and lower stop 100. The stop means 86, 92 and 100 serve to limit the axial relative movement of the gripper support members 60, 64, 74 and 76.

The supports 60 and 64 of the gripper assembly 52 are movable axially between the opposed surfaces of the upper stop 86 and the intermediate stop 92. Similarly, the supports 74 and 76 are axially movable between the opposed surfaces of the intermediate stop 92 and the lower stop 100. Radial movement of the supports 60, 64, 74 and 76 is prevented by the housing 10 and the spacing sleeves 94 and 102. The spacing sleeves 94 and 102 are provided with openings 108 and 110 therein, respectively, disposed in alignment with the respective gripper arms 58 and 72. In this manner, the gripper arms 58 and 72 are movable radially to the interior of the sleeves 94 and 102 into engagement with the lead screw 56. In addition, it will be seen that the respective central openings of the stops 86, 92 and 100 and of the spacing sleeves 94 and 102 are coextensive to form a continuous passageway in which the lead screw 56 is disposed for reciprocal movement.

In furtherance of this purpose, the lead screw 56 is provided with a plurality of axially spaced circumferential grooves or teeth 112 thereon which are disposed along the entire length thereof. Each of the gripper arms 58 and 72 is provided with an outwardly extending wedge-shaped tip 114 thereon disposed adjacent the lower ends thereof and shaped to be closely received between adjacent teeth 112 of the lead screw 56. The tips 114 are desirably formed from an extremely hard and wear-resistant material, for example from a cobalt-base alloy and are fixedly secured to the gripper arms 58 and 72 respectively by suitable securing means. Each of the wedge-shaped tips 114 desirably is formed to be positioned between adjacent teeth 112 of the lead screw 56 so that a slight axial clearance can exist between the tip 114 and the adjacent teeth 112 when the tip 114 is positioned centrally in one of the grooves formed between adjacent teeth 112 (the coupled position).

The lower gripper assembly 54 includes a washer 116 mounted on the outwardly facing surface of the spacing sleeve 102 and fixedly positioned in engagement with a downwardly facing shoulder 118 formed on the sleeve 102. The gripper support 74 includes a relatively narrow upper extension 117 of annular configuration disposed closely adjacent the sleeve 102 and having the upwardly facing surface thereof mounted in opposed relationship with the lower surface of washer 116. A compressional spring 120 is disposed between the last mentioned opposed surfaces and acts to bias the support 74 downwardly into engagement with the stop 100. The support 74 also includes a relatively thicker central portion having a plurality of longitudinally extending slots 122 therein with each of the slots 122 receiving a gripper arm 72. The lower portion 124 of the support 74 is relatively narrower than the central portion thereof with the lower portion 124 being disposed inwardly of the outward extent of the support 74 to form a downwardly facing shoulder 126 therebetween.

The support 76 for the gripper assembly 54 is formed by two annular members 128 and 130 which are joined to each other at a threaded connection 132. The upper member 128 includes an inwardly formed recess 134 thereon which receives the washer 116, spring 120 and annulus 117 between juxtaposed portions of the support 128 and the spacing sleeve 102. The annular member 130 is formed with a relatively larger central opening therein receiving therewithin the relatively thick central portion 122 of the support 74. The lower end of the annulus member 130 is provided with an inwardly extending annular flange 136 receiving the portion 124 of support 74 in the opening thereof. The flange 136 underlies the shoulder 126 of the support 74 so that upon upward movement of the support 76 relative to the support 74, the flange 136 engages the shoulder 126. The upper annular member 128 of the support 76 is formed from magnetic material so that the member 128 forms a portion of the magnetic flux path of the lower solenoid 20. The intermediate stop 92 forms another portion of the flux path for the lower solenoid 20 and therefore is also formed from magnetic material. The distance between the stop 92 and the upper surface of the member 128 as indicated by the arrow 138 forms the air gap for the lower solenoid 20 with the air gap 138 being juxtaposed to the lower nonmagnetic weld insert 12.

In accordance with the invention, a relatively thin nonmagnetic washer 140 is placed on the upwardly facing surface of the magnetic member 128 for the purpose of enhancing the rapid dissipation of flux in the air gap 138 when the solenoid 20 is deenergized. In addition, the intermediate stop 92 is desirably provided with a plurality of symmetrically disposed inwardly extending recesses 142, only one of which is shown in FIG. 1, with the open ends of each of the recesses 142 being juxtaposed to the washer 140. The recesses 142 are formed to receive a suitable biasing means such as a compression spring 144 which is mounted in compression between the inward end of the recess 142 and the washer 140 for the purpose of biasing the support 76 into engagement with the lower stop 100.

In accordance with the invention, it will be seen that the air gap 138 is maintained at a maximum by the springs 144 and by gravitational forces when the solenoid 20 is deenergized. Upon energization of the solenoid 20, magnetic flux flows in a circuitous path about the nonmagnetic weld insert 12 and passes through the support members 22, 24 and 26 of the lower solenoid 20, through adjacent portions of the magnetic housing 10 and through the member 128 of the support 76 and the intermediate stop 92. As the air gap 138 lies in the magnetic flux path, the flux acts to close the air gap 138 by lifting the support 76 against the force of the spring 144 into engagement with the lower surface of the stop 92. The effect of such movement of the support 76 to close the air gap 138 on the positions and movements of the lower gripper 72 will be discussed more fully hereinafter.

The supports 60 and 64 of the upper gripper assembly 52 are formed to move in a predetermined manner intermediate the stops 86 and 92. More particularly, the support 60 includes an annular member 146 which closely receives the spacing sleeve 94 in the central opening thereof and which includes a relatively narrow upper portion 148 and a relatively thicker lower portion 150. The lower portion 150 is provided with a plurality of longitudinally extending slots 152 therein with each of the slots 152 receiving one of the upper gripper arms 58. The upper portion 148 of the member 146 is provided with a threaded outward surface indicated by the reference character 154 with the threads 154 being adapted to threadedly secure the member 146 to a magnetic annulus 156. The annulus 156 extends laterally across the space between the housing 10 and sleeve 94 and forms a portion of the magnetic flux path of the upper solenoid 18. Opposed recesses 158 and 160 are formed respectively in the confronting surfaces of the annulus 156 and the upper stop 86 closely adjacent the spacing sleeve 94 and are positioned to receive therein the ends of a suitable biasing means such as a helical spring 162. The spring 162 receives the sleeve 94 in the central opening thereof and serves to bias the support 60 away from the upper stop 86 and into engagement with the lower stop 92.

The support 64 of the upper gripper assembly 52 includes a relatively heavy upper portion 164 movably positioned between the annulus 156 and the portion 150 of the annular member 146, and a relatively thinner lower portion 166 disposed between housing 10 and portion 150 of support 60. The support 64 is biased toward the intermediate stop 92 by a plurality of resilient means such as spring 168 disposed in recesses 170 in support 60, with only one such spring 168 being illustrated. The upper solenoid 18 acts to close the air gap between the supports 60 and 64 with such closing movement being opposed by the force of springs 168. In furtherance of this purpose, a nonmagnetic washer 172 is positioned on the upper surface of support 64 serving to dissipate the megnetic flux in an air gap upon deenergizing of solenoid 18. Solenoid 18 in FIG. 1 is illustrated in the energized condition so that the air gap between supports 60 and 64 is completely closed. In this manner, gripper arm 58 of gripper assembly 52 is pivotally moved into engagement with lead screw 56. When solenoid 18 is deenergized, the size of the air gap between supports 60 and 64 is maximized under the influence of springs 168 and gravitational pull on support 64. Support 64 moves downwardly from its position in FIG. 1 until the lower surface thereof engages the upwardly facing surface stop 92. In the latter position of support 64, gripper arms 58 of gripper assembly 52 are located in the unlatched position.

Figure 5:
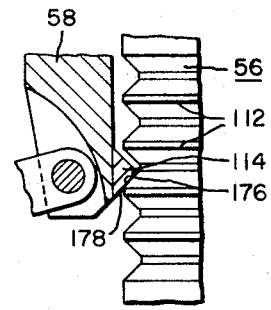
FIG. 5 is a fragmentary view similar to FIGS. 3 and 4 of one of the upper grippers of FIG. 1 illustrated in the "linked" position.

It will be noted, however, that when solenoid 18 is energized and with the air gap between supports 60 and 64 being closed so that the gripper arms 58 are in the position illustrated in FIG. 1, upward movement of the lead screw 56, caused for example by a lifting action exerted thereupon by the gripper assembly 54, results in the movement of the upper gripper assembly 52 and its associated supports 60 and 64 upwardly as a unit against the force of the spring 162. The gripper arms 58 are then moved from the latch position as illustrated in FIG. 1 to the linked position as illustrated in FIG. 5. Since solenoid 18 remains energized during such movement of lead screw 56, the relative positions of supports 60 and 64 remain the same.

It will be seen that the upper gripper assembly 52 is movable to four relative positions, the first such relative position is the gripper position illustrated in FIG. 1 and referred to herein as the latched position wherein the gripper assembly 52 is subjected to the weight of the lead screw 56. By causing relative movement of the lead screw 56 upwardly, the upper gripper assembly 52 is moved from the latch position of FIG. 1 through the coupled position (FIG. 3) to the linked position of FIG. 5 wherein the downwardly facing surfaces of the tips 114 are positioned in engagement with the upwardly facing surface of one of the teeth 112. By deenergizing the solenoid 18 when the gripper assembly 52 is in the linked position, the support 64 moves downwardly under the influence of springs 168 causing the gripper arms 58 to move pivotally outwardly until the gripper arms 58 are freed from the teeth 112 of lead screw 56. The gripper arms 58 continue to move pivotally toward the housing 10 and to the unlatched position (the position illustrated for lower gripper 54 of FIG. 1). Such radial movement of gripper arms 58 relative to lead screw 56 takes place while the lower surface 178 of tip 114 engages an upward surface 176 of one of the teeth 112. Frictional engagement and wear of the surfaces 176 and 178 occurs upon movement of the gripper arm 58 from the linked to the unlatched position, however, it is to be realized that the amount of such friction is relatively small because the magnitude of the downward force of the latter two surfaces is determined only by the weight of support 60 and the force of spring 162. Spring 162 desirably is made relatively weak to minimize the magnitude of the frictional engagement.

Considering now the lower gripper assembly 54 of FIG. 1, it will be appreciated that lower solenoid 20 is illuustrated in the deenergized state, thereby maximizing the size of the air gap 138 so that gripper arms 72 are disposed in the unlatched position. Upon energizing the solenoid 20, the support 76 moves upwardly toward stop 92 to close air gap 138. Concurrent upward movement of the support 74 during a portion of the closing movement of air gap 138 is prevented by spring 120 until shoulder 126 is engaged by flange 136. When flange 136 engages shoulder 126, the air gap 138 is not completely closed. However, the movement of support 76 relative to support 74 has caused pivotal movement of gripper arms 72 from the unlatched positions illustrated in FIG. 1 to the "coupled" position illustrated in dotted lines in FIG. 1. When flange 136 engages shoulder 126, the support 74 is carried by support 76 during the remainder of the closing movement of air gap 138. Thus, the tip 114 of gripper arm 72 moves from the coupled position illustrated in dotted lines in FIG. 1 and in FIG. 3 upwardly to the latched position of FIG. 4 wherein the tip 114 is subjected to the weight or load of lead screw 56. Upward movement of the lead screw 56 is continued until the air gap 138 is completely closed. The magnitude of the total of such upward movement of lead screw 56 is carefully controlled to be exactly equal to twice the clearance between tip 114 and teeth 112 when tip 114 is in the coupled position plus the spacing between adjacent teeth 112 of lead screw 56.

To obtain additional upward incremental movement of the lead screw 56, the sequence of operations of the gripper assemblies 52 and 54 is continued as follows.

Solenoid 20 is deenergized when the upper gripper assembly 52 is in the coupled position (solenoid 18 is energized) and the lower gripper assembly 54 is in the latched position. The deenergizing of solenoid 20 causes the opening of air gap 138 by the downward movement of supports 74 and 76 under the influence of springs 120 and 144, respectively. The initial downward movement of gripper members 54 is accompanied by lead screw 56 until the weight of the lead screw is imparted to the upper gripper assembly 52. The downward movement of lower gripper arms 72 causes the gripper arms 72 to move from the latched position (FIG. 4) through the coupled position (FIG. 3) to the linked position (FIG. 5). When surfaces 178 of tips 114 of gripper arms 72 engage the upwardly facing surface 176 of teeth 112, downward movement of the support 74 is prevented while downward movement of support 76 continues. The relative downward movement of support 76 with respect to support 74 causes the gripper arms 72 to move pivotally outwardly from the linked position toward the unlatched position. When the tips 114 of gripper arms 72 move pivotally outwardly in amounts sufficient to clear them completely from teeth 112, downward movement of support 74 is renewed until support 74 engages stop 100. Similarly downward movement of support 76 continues until the lower end thereof engages stop 100.

It is to be realized that the relative axial positions of gripper assemblies 52 and 54 must be carefully set so that when each gripper arm 58 or 72 moves from the unlatched position laterally toward the lead screw 56, the gripper arms 58 or 72 move directly to the coupled position (FIG. 3), rather than to the latched position (FIG. 4). In furtherance of this purpose, a pair of annular shims 174 are positioned intermediate the stop 92 and support 60 to position accurately the latch arm 58 relative to the latch arm 72.

Operation of the linear motion device

The linear motion device of this invention is operated to move the lead screw 56 incrementally in the upward direction, as determined by FIG. 1. Assuming now that the solenoid 18 is energized and the solenoid 20 is deenergized, and assuming that the gripper arms 58 are in the latched position while the gripper arms 72 are in the unlatched position, as shown, incremental upward movement of the lead screw 56 is accomplished in the following manner. Solenoid 20 is energized causing upward movement of the support 76 toward stop 92 for the purpose of closing air gap 138. During the initial portion of the upward movement of support 76, support 74 remains stationary under the influence of spring 120. When flange 136 engages shoulder 126, gripper arm 72 is located in the coupled position (shown in dotted lines in FIG. 1 and as illustrated in FIG. 3) wherein there exists an axial clearance 177 between tip 114 and teeth 112 of lead screw 56. With gripper arms 72 in the coupled position, air gap 138 is not completely closed and further upward movement of support 76 carrying with it support 74 continues. The latter upward movement causes gripper arms 72 to move from the coupled position to the latch position (FIG. 4). When gripper arms 72 reach the latched position, all of the load on gripper arms 58 is removed therefrom and gripper arms 58 are moved through the coupled position to the linked position (FIG. 5). Further upward movement of supports 76 and 74 carrying with them lead screw 56 continues until air gap 138 is completely closed. This upward movement of lead screw 56 carries the upper gripper assembly 52, until the solenoid 18 is deenergized. The magnitude of the total upward movement is made precisely equal to twice the size of clearance 177 plus the distance between adjacent teeth 112 of lead screw 56. The upward movement of lead screw 56 caused by the closing of air gap 138 results in the lifting of gripper arms 58 and supports 60 and 64 by teeth 112 of lead screw 56 against the downward force of spring 162. After gripper arms 72 reach the latched position, solenoid 18 desirably is deenergized, causing downward movement of support 64 with respect to support 60 under the influence of springs 168. The latter downward movement results in the movement of gripper arm 58 from the linked position (FIG. 5) to the unlatched position (the position illustrated for lower gripper arm 72 in FIG. 1).

It will be appreciated that the latter movement of gripper arms 58 from the linked position to the unlatched position, results in frictional engagement between the upper surface 176 of teeth 112 and the lower surface 178 of tip 114. As heretofore explained, such frictional engagement provides only a small amount of wear on the surfaces 176 and 178 inasmuch as the magnitude of such wear is determined solely by the weight of supports 60 and 64 and the magnitude of the spring force exerted by spring 162. During the initial movement of gripper arm 58 from the linked position, support 64 moves relative to support 60 causing gripper arms 58 to move pivotally outwardly toward the unlatched position. As soon as gripper arms 58 are freed from teeth 112, supports 60 and 64 move downwardly simultaneously under the influence of spring 162 until the lower surface of support 60 engages shim 174. Concurrently, support 64 moves downwardly relative to support 60 under the influence of springs 168.

It is to be realized that solenoid 18 may be deenergized at any time after lower gripper arms 72 are in the latched position. It is not necessary for air gap 138 to be closed before deenergizing solenoid 18. If solenoid 18 is deenergized during the closing movement of air gap 138, the speed of movement of lead screw 56 is increased.

It will be noted that as gripper arms 72 move from the unlatched position to the coupled position, there is no frictional engagement between tip 114 and teeth 112. Upward movement of tip 114 begins only after the completion of the lateral movement of tip 114 and surface 180 of adjacent tooth 112 and surface 182 of tip 114 moving to engagement during only relative axial movement of tip 114. There exists no relative lateral movement of the latter two surfaces, thereby preventing frictional interaction and wear of surfaces 180 and 182.

With solenoid 20 energized and solenoid 18 deenergized, gripper arms 72 are in the latched position and gripper arms 58 are in the unlatched position. Gripper arms 58 are now moved to the coupled position by energizing solenoid 18. Solenoid 20 is then deenergized resulting in the following movement. Supports 74 and 76 move downwardly with lead screw 56 a distance equal to the clearance 177. The weight of lead screw 56 is then absorbed by gripper arms 58 placing gripper arms 72 in the coupled position. Downward movement of supports 74 and 76 continues and gripper arms 72 move from the coupled position to the linked position. When the gripper arms 72 are in the linked position, surfaces 176 and 178 are in engagement and further downward movement of gripper arms 72 and support 74 is prevented. Downward movement of support 76, however, continues resulting in pivotal movement of gripper arms 72 outwardly away from teeth 112 resulting in a sliding action between surfaces 176 and 178. When tips 114 of gripper arms 72 are cleared from adjacent tooth 112, downward movement of gripper arms 72, support 74 and concurrently support 76 continues until portion 124 of support 74 engages stop 100. Support 76 continues to move downwardly until the latter engages stop 100.

When the latter movement has been completed, the linear motion device has returned to the position illustrated in FIG. 1 so that further incremental upward movement of lead screw 56 may be continued by repeating the sequence of energization and deenergization of solenoids 18 and 20, as described.

It will be noted that as gripper arms 72 move from the linked position to the unlatched position after deenergization of solenoid 20, frictional engagement between surfaces 176 and 178 occurs, however, the magnitude of such frictional engagement depends solely upon the weight of supports 72 and 76 and the magnitude of the spring force exerted by spring 120. Accordingly, the wear on surfaces 176 and 178 will be relatively small. With respect to surfaces 180 and 182, however, it will be appreciated that there is substantially no frictional interaction or wear between the latter two surfaces. As a result, a linear motion device having a long lifetime without substantial wear of the moving parts thereof is constructed pursuant to the teachings of this invention.

It will be realized that many modifications may be made to portions of the linear motion device described herein without departing from the broad spirit and scope of this invention. It is, therefore, intended that the above-detailed description of a specific embodiment of this invention be interpreted as illustrative of the invention, rather than as limitative thereof.

I claim as my invention:

1. A linear motion device comprising a linearly movable element having a plurality of axially spaced teeth formed thereon; a first gripper means movable to latched, coupled, linked and unlatched positions relative to said element; a second gripper means movable to latched, coupled, linked and unlatched positions relative to said element; means for moving said first gripper means, when said second gripper means is in the latched position, from the unlatched position through the coupled position to the latched position thereby moving said second gripper means from the latched position through the coupled position to the linked position; and means for moving said second gripper means from the linked position to the unlatched position.

2. A linear motion device comprising a linearly movable element having a plurality of axially spaced teeth formed thereon; a first gripper means movable to latched, coupled, linked and unlatched positions relative to said element; a second gripper means movable to latched, coupled, linked and unlatched positions relative to said element; said teeth being spaced an amount sufficient to provide a clearance between said teeth and said first and second gripper means, when the latter are in the coupled position; means for moving said first gripper means, when said second gripper means is in the latched position, from the unlatched position through the coupled position to the latched position thereby moving said second gripper means from the latched position through the coupled position to the linked position; said first gripper means during the aforesaid movement moving said element an increment equal to twice said clearance plus said amount of said spacing; and means for moving said second gripper means from the linked position to the unlatched position.

3. A linear motion device comprising a linearly movable element having a plurality of axially spaced teeth thereon; a gripper means for incrementally moving said element, said gripper means having a portion pivotally movable between opposed surfaces on adjacent ones of said teeth, said teeth being spaced an amount sufficient to provide a clearance between each of said opposed surfaces of said adjacent teeth and said gripper means portion, means for moving said gripper means portion first laterally toward said element to a position between said adjacent teeth wherein said clearances exist and then axially into engagement with one of said surfaces to move said element, means for moving said gripper means portion axially away from said one surface and into engagement with the other of said surfaces and then laterally while said portion and said other surface are in engagement to move said gripper means away from said element.

4. A linear motion device for moving a vertically extending element upwardly in increment comprising a linearly movable element having a plurality of axially spaced teeth thereon, a pair of axially spaced gripper means each movable to unlatched, coupled, latched and linked positions relative to said element, adjacent ones of said teeth each being axially spaced a distance sufficient to provide a clearance between said teeth and each of said gripper means when said gripper means are respectively located in said coupled position; means for moving one of said gripper means, when the other of said gripper means is in the latched position, from the unlatched position pivotally to the coupled position and then axially an amount equal to twice said clearance plus said distance between said adjacent teeth to move said element upwardly for one increment and to move said other gripper means from said latched position through said coupled position to said linked position, means for moving said other gripper means laterally from said linked position to said unlatched position when said one gripper means is in said latched position, and means for moving said other gripper means downwardly relative to said element when said other gripper means is in the unlatched position to position said other gripper means adjacent the next lower tooth of said element.

5. A linear motion device for moving a vertically extending element upwardly in increment comprising a linearly movable element having a plurality of axially spaced teeth thereon, a pair of axially spaced gripper means each movable to unlatched, coupled, latched and linked positions relative to said element, adjacent ones of said teeth each being axially spaced a distance sufficient to provide a clearance between said teeth and each of said gripper means when said gripper means are respectively located in said coupled position; first solenoid means coupled to one of said gripper means, said first solenoid means being energizable to move said one gripper means, when the other of said gripper means is in the latched position, from the unlatched position pivotally to the coupled position and then axially an amount equal to twice said clearance plus said distance between said adjacent teeth to move said element upwardly for one increment and to move said other gripper means from said latched position through said coupled position to said linked position, section solenoid means for moving said other gripper means laterally from said linked position to said unlatched position when said one gripper means is in said latched position, and resilient means for moving said other gripper means downwardly relative to said element when said other gripper means is in the unlatched position to locate said other gripper means adjacent the next lower tooth of said element.

6. A linear motion device comprising a linearly movable element having a plurality of axially spaced teeth formed thereon; a first gripper means movable to latched coupled, linked and unlatched positions relative to said element; a second gripper means movable to latched, coupled, linked and unlatched positions relative to said element; means for moving said first gripper means, when said second gripper means is in the latched position, from the unlatched position through the coupled position to the latched position thereby moving said second gripper means from the latched position through the coupled position to the linked position; means for moving said second gripper means from the linked position to the unlatched position; said second gripper means being axially moved in one direction by said element when said second gripper means is in said linked position; and means for moving said second gripper means when the latter is in the unlatched position axially in the direction opposite to said one direction.

7. A linear motion device comprising a linearly movable element having a plurality of axially spaced teeth formed thereon; a first gripper means movable to latched, coupled, linked and unlatched positions relative to said element; a second gripper means movable to latched, coupled, linked and unlatched positions relative to said element; said teeth being spaced an amount sufficient to provide a clearance between said teeth and said first and second gripper means, when the latter are in the coupled position; means for moving said first gripper means, when said second gripper means is in the latched position, from the unlatched position through the coupled position to the latched position thereby moving said second gripper means from the latched position through the coupled position to the linked position; said first gripper means during the aforesaid movement moving said element an increment equal to twice said clearance plus said amount of said spacing; means for moving said second gripper means from the linked position to the unlatched position; said second gripper means being axially moved in one direction by said element when said second gripper means is in said linked position; and means for moving said second gripper means when the latter is in the unlatched position axially in the direction opposite to said one direction.

8. In a linear motion device for moving a linearly movable element only in one direction and utilizing only two solenoid means, the combination comprising a linearly movable element having a plurality of axially spaced teeth thereon, a first and a second gripper means each movable to unlatched, coupled, latched and linked positions relative to said element, a first and a second pair of supports for said first and second gripper means, respectively, said gripper means being pivotally mounted on said pairs of supports, respectively; a first and a second solenoid means disposed adjacent said first and said second pairs of supports, respectively, first resilient means biasing said one pair of supports in the direction opposite to said one direction, second resilient means biasing apart said supports of said first pair of supports, means energizing said first solenoid means to move said first pair of supports into engagement against the force of said second resilient means and to move said first gripper means pivotally toward said element, means for energizing said second solenoid means to move said second pair of supports relative to one another to move said second gripper means from the unlatched position to the coupled position and then to the latched position and then to move said element a distance equal to the spacing between said teeth, said first gripper means during the aforesaid movement of said second gripper means and said element being moved from the latched position through the coupled position to the linked position and then being moved against the force of said first resilient means with said element for at least a portion of said distance, means deenergizing said first solenoid means when said first gripper means is in said linked position to move said first pair of supports apart under the influence of said second resilient means to move said first gripper means from the linked to the unlatched position.

9. In a linear motion device for moving a linearly movable element only in one direction and utilizing only two solenoid means, the combination comprising a linearly movable element having a plurality of axially spaced teeth thereon, a first and a second gripper means each movable to unlatched, coupled, latched and linked positions relative to said elements, a first and a second pair of supports for said first and second gripper means, respectively, said gripper means being pivotally mounted on said pairs of supports, respectively; a first and a second solenoid means disposed adjacent said first and said second pairs of supports, repectively, first resilient means biasing said one pair of supports in the direction opposite to said one direction, second resilient means biasing apart said supports of said first pair of supports, means energizing said first solenoid means to move said first pair of supports into engagement against the force of said second resilient means and to move said first gripper means pivotally toward said element, means for energizing said second solenoid means to move said second pair of supports relative to one another to move said second gripper means from the unlatched position to the coupled position and then to the latched position and then to move said element a distance equal to the spacing between said teeth, said first gripper means during the aforesaid movement of said second gripper means and said element being moved from the latched position through the coupled position to the linked position and then being moved against the force of said first resilient means with said element for at least a portion of said distance, means deenergizing said first solenoid means when said first gripper means is in said linked position to move said first pair of supports apart under the influence of said second resilient means to move said first gripper means from the linked to the unlatched position, said first gripper means being moved when in the unlatched position under the influence of said first resilient means axially to a position juxtaposed to adjacent teeth on said element.

References Cited by the Examiner

UNITED STATES PATENTS

| | | | |
|---|---|---|---|
| 2,829,530 | 4/1958 | Holden | 74—128 |
| 2,924,981 | 2/1960 | Critchlow | 74—169 X |
| 2,926,535 | 3/1960 | Heselwood | 74—169 |
| 3,050,943 | 8/1962 | Thorel et al. | 310—12 X |
| 3,122,027 | 2/1964 | Trisch et al. | 318—134 X |
| 3,158,766 | 11/1964 | Frisch | 310—14 |

MILTON O. HIRSHFIELD, *Primary Examiner.*

D. F. DUGGAN, *Assistant Examiner.*